(12) United States Patent
Sahlin et al.

(10) Patent No.: US 10,893,538 B2
(45) Date of Patent: Jan. 12, 2021

(54) METHODS AND DEVICES FOR SCHEDULING UPLINK DATA

(71) Applicant: Telefonaktiebolaget LM Ericsson (publ), Stockholm (SE)

(72) Inventors: Henrik Sahlin, Mölnlycke (SE); Niklas Andgart, Södra Sandby (SE); Gustav Wikström, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 123 days.

(21) Appl. No.: 16/074,097

(22) PCT Filed: Feb. 3, 2017

(86) PCT No.: PCT/SE2017/050095
§ 371 (c)(1),
(2) Date: Jul. 31, 2018

(87) PCT Pub. No.: WO2017/135880
PCT Pub. Date: Aug. 10, 2017

(65) Prior Publication Data
US 2020/0112981 A1    Apr. 9, 2020

Related U.S. Application Data

(60) Provisional application No. 62/291,650, filed on Feb. 5, 2016.

(51) Int. Cl.
*H04W 72/14* (2009.01)
*H04L 5/00* (2006.01)
*H04W 72/04* (2009.01)

(52) U.S. Cl.
CPC .......... *H04W 72/14* (2013.01); *H04L 5/0048* (2013.01); *H04W 72/0446* (2013.01)

(58) Field of Classification Search
CPC ..................................................... H04W 72/14
See application file for complete search history.

(56) References Cited

FOREIGN PATENT DOCUMENTS

| WO | 2015042594 A2 | 3/2015 |
| WO | 2017030484 A1 | 2/2017 |
| WO | 2017078595 A1 | 5/2017 |

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 11)", 3GPP TS 36.212 V11.2.0, Feb. 2013, 1-82.
(Continued)

*Primary Examiner* — Angel T Brockman
(74) *Attorney, Agent, or Firm* — Murphy, Bilak & Homiller, PLLC

(57) ABSTRACT

Methods and apparatus for generating a scheduling grant for a wireless device of a communication system are provided. The communication system supports variable TTI lengths to be transmitted in one TTI. It is presented how to determine a TTI length for a scheduled TTI, where the TTI length is determined in number of symbols. It is further presented how to determine at least one reference signal parameter for the scheduled TTI, where the at least one reference symbol parameter is selected from a reference symbol position and a reference symbol cyclic shift. Finally, encoding the TTI length and the at least one reference symbol parameter into a TTI index is presented.

20 Claims, 17 Drawing Sheets

| TTI index 4 bits | TTI length | DMRS position | DMRS cyclic shift | Illustration |
|---|---|---|---|---|
| 0 | 2 | 0 | 0 | |
| 1 | 2 | 1 | 6 | |
| 2 | 2 | 2 | 3 | |
| 3 | 2 | 3 | 1 | |
| 4 | 2 | -1 | 9 | |
| 5 | 2 | -2 | 10 | |
| 6 | 3 | 0 | 0 | |
| 7 | 3 | 1 | 0 | |
| 8 | 3 | 2 | 6 | |
| 9 | 3 | 3 | 3 | |
| 10 | 3 | -1 | 9 | |
| 11 | 4 | 0 | 0 | |
| 12 | 4 | 1 | 9 | |
| 13 | 4 | 2 | 6 | |
| 14 | 4 | 3 | 6 | |
| 15 | 7 | 3 | 0 | |

(56) References Cited

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 12)", 3GPP TS 36.212 V12.7.0, Dec. 2015, 1-94.
3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.6.0, Jun. 2015, 1-136.
Unknown, Author, "Physical layer aspects of short TTI for uplink transmissions", 3GPP TSG RAN WG1 Meeting #83, R1-157149, Anaheim, USA, Nov. 15-22, 2015, 1-4.
Unknown, Author, "System simulation results with non-static TTI", 3GPP TSG RAN1 LTE Ad Hoc, R1-061715, Jun. 27-30, 2006, 1-8.

| TTI index 4 bits | TTI length | DMRS position | DMRS cyclic shift | Illustration |
|---|---|---|---|---|
| 0 | 2 | 0 | 0 | |
| 1 | 2 | 1 | 6 | |
| 2 | 2 | 2 | 3 | |
| 3 | 2 | 3 | 1 | |
| 4 | 2 | -1 | 9 | |
| 5 | 2 | -2 | 10 | |
| 6 | 3 | 0 | 0 | |
| 7 | 3 | 1 | 0 | |
| 8 | 3 | 2 | 6 | |
| 9 | 3 | 3 | 3 | |
| 10 | 3 | -1 | 9 | |
| 11 | 4 | 0 | 0 | |
| 12 | 4 | 1 | 9 | |
| 13 | 4 | 2 | 6 | |
| 14 | 4 | 3 | 6 | |
| 15 | 7 | 3 | 0 | |

Figure 8

| TTI index 4 bits | TTI length | DMRS position | DMRS cyclic shift | Illustration |
|---|---|---|---|---|
| 0 | 1 | - | - | |
| 1 | 1 | 0 | 0 | |
| 2 | 2 | 0 | 0 | |
| 3 | 2 | 1 | 6 | |
| 4 | 2 | 2 | 3 | |
| 5 | 2 | 3 | 1 | |
| 6 | 2 | -1 | 9 | |
| 7 | 2 | -2 | 10 | |
| 8 | 3 | 0 | 0 | |
| 9 | 3 | 1 | 0 | |
| 10 | 3 | 2 | 6 | |
| 11 | 4 | 0 | 0 | |
| 12 | 4 | 1 | 9 | |
| 13 | 4 | 2 | 6 | |
| 14 | 4 | 3 | 6 | |
| 15 | 7 | 3 | 0 | |

Figure 9

| TTI index 3 bits | TTI length | DMRS position | DMRS cyclic shift | Illustration |
|---|---|---|---|---|
| 0 | 2 | 0 | 0 | |
| 1 | 2 | 1 | 6 | |
| 2 | 3 | 0 | 0 | |
| 3 | 3 | 1 | 0 | |
| 4 | 3 | 2 | 6 | |
| 5 | 4 | 0 | 0 | |
| 6 | 4 | 3 | 6 | |
| 7 | 7 | 3 | 0 | |

Figure 10

| TTI index 3 bits | TTI length | DMRS position | DMRS cyclic shift | Illustration |
|---|---|---|---|---|
| 0 | 1 | 0 | - | |
| 1 | 2 | 0 | 0 | |
| 2 | 2 | 1 | 6 | |
| 3 | 3 | 0 | 0 | |
| 4 | 3 | 2 | 6 | |
| 5 | 4 | 0 | 0 | |
| 6 | 4 | 3 | 6 | |
| 7 | 7 | 3 | 0 | |

Figure 11

| TTI index 2 bits | TTI length | DMRS position | DMRS cyclic shift | Illustration |
|---|---|---|---|---|
| 0 | 2 | 0 | 0 | R R R D D D D |
| 1 | 3 | 0 | 0 | D D D D |
| 2 | 4 | 0 | 0 | D D D D |
| 3 | 7 | 3 | 0 | D D D R D D D |

Figure 12

| TTI index 2 bits | start symbol | TTI length | DMRS position | DMRS cyclic shift | Illustration |
|---|---|---|---|---|---|
| 0 | 0,3,6,9,12 | 2 | 1 | 6 | |
| 0 | 1,4,7,10 | 2 | 0 | 0 | |
| 1 | 0,5,10 | 3 | 2 | 6 | |
| 1 | 2,7 | 3 | 0 | 0 | |
| 2 | 0,7 | 4 | 3 | 6 | |
| 2 | 3,10 | 4 | 0 | 0 | |
| 3 | 0,7 | 7 | 3 | 0 | |

Figure 13

METHODS AND DEVICES FOR SCHEDULING UPLINK DATA

TECHNICAL FIELD

The present invention generally relates to communication networks and particularly relates to scheduling uplink grant of data and reference signals.

BACKGROUND

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

One performance metric that guided the design of Long Term Evolution, LTE, was better latency than previous generations of Radio Access Technologies, RATs, defined by the Third Generation Partnership Project, 3GPP. LTE is also now recognized by the end-users to be a system that provides faster access to Internet and lower data latencies than previous generations of mobile radio technologies.

Packet data latency is important not only for the perceived responsiveness of the system; it is also a parameter that indirectly influences the throughput of the system. Hyper-Text Transport Protocol/Transport Control Protocol, HTTP/TCP, is the dominant application and transport layer protocol suite used on the Internet today. According to HTTP Archive, http://httparchive.org/trends.php, the typical size of HTTP-based transactions over the Internet range from a few 1 Os of Kbytes up to 1 Mbyte. In this size range, the TCP slow start period is a significant part of the total transport period of the packet stream. During TCP slow start, the "congestion window" used by TCP for defining the amount of traffic that can be outstanding, i.e., transmitted but not acknowledged, and packet latency limits how quickly the congestion window can be optimized. Hence, improved latency improves the average throughput for these types of TCP-based data transactions.

Radio resource efficiency in general is positively impacted by latency reductions. Lower packet data latency could increase the number of transmissions possible within a certain delay bound; hence higher BLER targets could be used for the data transmissions freeing up radio resources potentially improving the capacity of the system. There are a number of current applications that will be positively impacted by reduced latency in terms of increased perceived quality of experience: examples are gaming, real-time applications like VoLTE/OTT VoIP and multi-party video conferencing. In the future, there will be a number of new applications that will be more delay critical. Examples may be remote control/driving of vehicles, augmented reality applications in e.g. smart glasses, or specific machine communications requiring low latency.

Finally, it is appreciated herein that reduced latency of data transport may also indirectly give faster radio control plane procedures like call set-up/bearer set-up, due to the faster transport of higher layers control signaling. For example, the LTE air interface is based on radio access network control and scheduling. These facts impact the latency performance since a transmission of data needs a round trip of lower layer control signaling.

Correspondingly, it is recognized herein that one area to address when it comes to packet latency reductions is the reduction of transport time of data and control signaling, which, according to the teachings herein, can be accomplished by allowing for shorter scheduling intervals. Here, a "scheduling interval" is the smallest unit of time allocated when scheduling resources. In LTE, scheduling intervals are referred to as "Transmission Time Intervals" or TTIs. Each TTI spans one sub-frame, which in turn spans two slots, each slot comprising six or seven OFDM symbol times in dependence on whether normal or extended Cyclic Prefixes (CP) are in use. The reduction of processing time of control signaling at the involved receiver, e.g., the processing time needed by a UE to process a scheduling grant, is also recognized herein as an important aspect of reducing latency.

One area to address when it comes to packet latency reductions is the reduction of transport time of data and control signaling, by addressing the length of a transmission time interval (TTI). In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix. In LTE release 13, a study item is starting during 2015, with the goal of specifying transmissions with shorter TTIs that are much shorter than the LTE release 8 TTI.

The communication between the network nodes, such as for example base stations, and the user equipment (UE) is based on standardization, standard protocol and standard specifications. The network communication system relies on the standard specification in order for the system to function properly.

Potential Problems with these Approaches:

The existing way of operation, e.g. frame structure and control signals, are designed for fixed length 1 ms data allocations, which may vary only in allocated bandwidth. Specifically, the current Downlink Control Information (DCI) define resource allocations within the entire SF.

Indication of TTIs of lengths 2, 3, 4, and 7 would require 2 bits and indication of position of the reference signals (RSs) additional 3 bits which would add up to 5 bits in total. If support is required for single symbol TTIs, without reference signals, then 3 bits are required for the TTI length. Furthermore, if transmissions of reference signals without any data would be supported, yet one additional bit is required for this case. The cyclic shift of reference signals require 3 bits in current DCI format 0 and 4, see section 5.3.3.1.1 and 5.3.3.1.8 in [3GPP TS 36.212, V11.2.0].

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

According to some embodiments a method for generating a scheduling grant for a wireless device of a communication system is provided, where the communication system supports variable TTI lengths to be transmitted in one TTI. The method includes determining a TTI length for a scheduled TTI, where the TTI length is determined in number of symbols. The method further includes determining at least one reference signal parameter for the scheduled TTI, where the at least one reference symbol parameter is selected from a reference symbol position and a reference symbol cyclic shift. Finally the method includes encoding the TTI length and the at least one reference symbol parameter into a TTI index.

According to some other embodiments a method for a wireless device for a communication system supporting variable TTI lengths regarding a number of symbols to be transmitted in one TTI is provided. The method includes receiving a scheduling grant including a TTI index, where the TTI index encodes a TTI length and at least one reference symbol parameter for a scheduled TTI, where the at least one reference symbol parameter is selected from a reference symbol position and a reference symbol cyclic shift. The method further includes decoding the TTI length and the reference symbol parameter from the TTI index and scheduling a transmission in accordance with the determined TTI length and the determined reference symbol parameter.

According to further embodiments a method for generating a scheduling grant for a wireless device of a communication system is provided, where the communication system supports variable Transmission Time Interval, TTI, lengths regarding a number of symbols to be transmitted in one TTI-generate a scheduling grant including the TTI index and the TTI start symbol position. The method includes determining a TTI length and a TTI start symbol position within a sub-frame for a scheduled TTI, where the determined TTI length and TTI start symbol position are uniquely associated with at least one reference symbol parameter and where the at least one reference symbol parameter is selected from a reference symbol position and a reference symbol cyclic shift. The method further includes encoding the TTI length into a TTI index. Furthermore, the method includes generating a scheduling grant including the TTI index and the TTI start symbol position.

Furthermore, according to other embodiments a method for a wireless device for a communication system supporting variable Transmission Time Interval, TTI, lengths regarding a number of symbols to be transmitted in one TTI is provided. The method includes receiving a scheduling grant including a TTI index and a TTI start symbol position for a scheduled TTI, where the TTI index encodes a TTI length for the scheduled TTI and where the TTI length and the TTI start symbol position are uniquely associated with at least one reference symbol parameter, where the at least one reference symbol parameter is selected from a reference symbol position and a reference symbol cyclic shift. The method further includes decoding the TTI length from the TTI index. Furthermore, the method includes decoding the at least one reference symbol parameter from the determined TTI length and from the TTI start symbol position. Finally, the method includes scheduling a transmission in accordance with the determined TTI length, the at least one determined reference symbol position and the TTI start symbol position.

The above disclosed embodiments reduced the control signaling overhead as compared to granting length of TTI, cyclic shift and position of reference signals and user data symbols separately. The signaling is reduced by using TTI index, which contains all the information. In one embodiment the TTI length and the at least one reference symbol parameter into a TTI index are encoded into a TTI index, which reduces the amount of data that needs to processed and/or transmitted.

Further possible features and benefits of the invention will be explained in the detailed description below.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIG. 8 Illustratively shows the mapping between a "TTI index" with 4 bits to TTI length and position of reference signals PDCCH boosting based on the system load.

FIG. 9 illustratively shows the mapping between a "TTI index" with 4 bits to TTI length and position of reference signals with support for user data and reference signal only transmissions.

FIG. 10 illustratively shows mapping between a "TTI index" with 3 bits to TTI length and position of reference signals.

FIG. 11 illustratively shows mapping between a "TTI index" with 3 bits to TTI length and position of reference signals with support for user data only transmissions.

FIG. 12 illustratively shows mapping between a "TTI index" with 2 bits to TTI length and position of reference signals with support for user data only transmissions.

FIG. 13 illustratively shows mapping between a "TTI index" with 2 bits to TTI length and position of reference signal, where the starting symbol index of the TTI determines the DMRS position FIG. 14 illustratively shows a block diagram of example embodiments of generating a scheduling grant according to the teachings herein.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Various present embodiments disclosed herein may overcome one or more of the potential problems explained above with some previously known approaches.

The various embodiments herein are directed to operations and methods performed by a user equipment and/or a network node. The user equipment may be a cellular radio-telephone—e.g., a smartphone, a feature phone, etc. Alternatively, the user equipment (UE) comprises a network adaptor or card, a modem or other such interface device, a tablet or laptop computer, or other device with wireless communication capabilities. Of course, these examples are non-limiting and the user equipment should be broadly understood as a communications transceiver. And, as noted above, the wireless device 12, which also may be referred to as a "wireless communication apparatus", is comprised in a UE.

Figure 1:
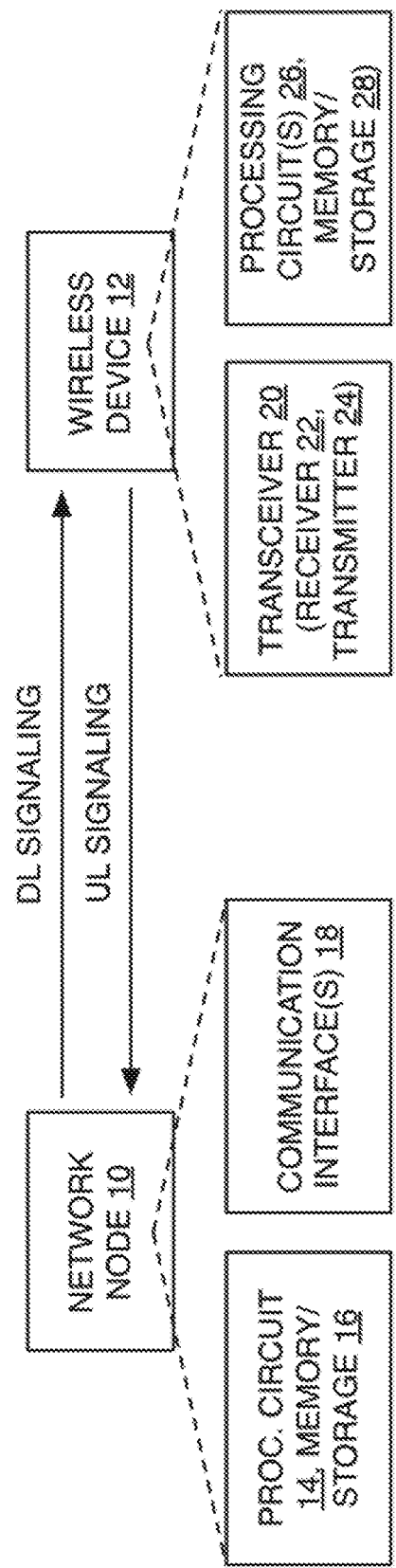
FIG. 1 is a block diagram of an examplary network node and a wireless device.

With the above discussion in mind FIG. 1 illustrates an example network node 10 and an associated wireless device 12. Correspondingly, the network node 10 may comprise, e.g., a type of base station or another radio node within the Radio Access Network, RAN, portion of a wireless communication network. In at least some embodiments, the network node 10 comprises an LTE eNB and the wireless device 12 is comprised in a UE configured for operation in LTE-based networks.

Figure 2:
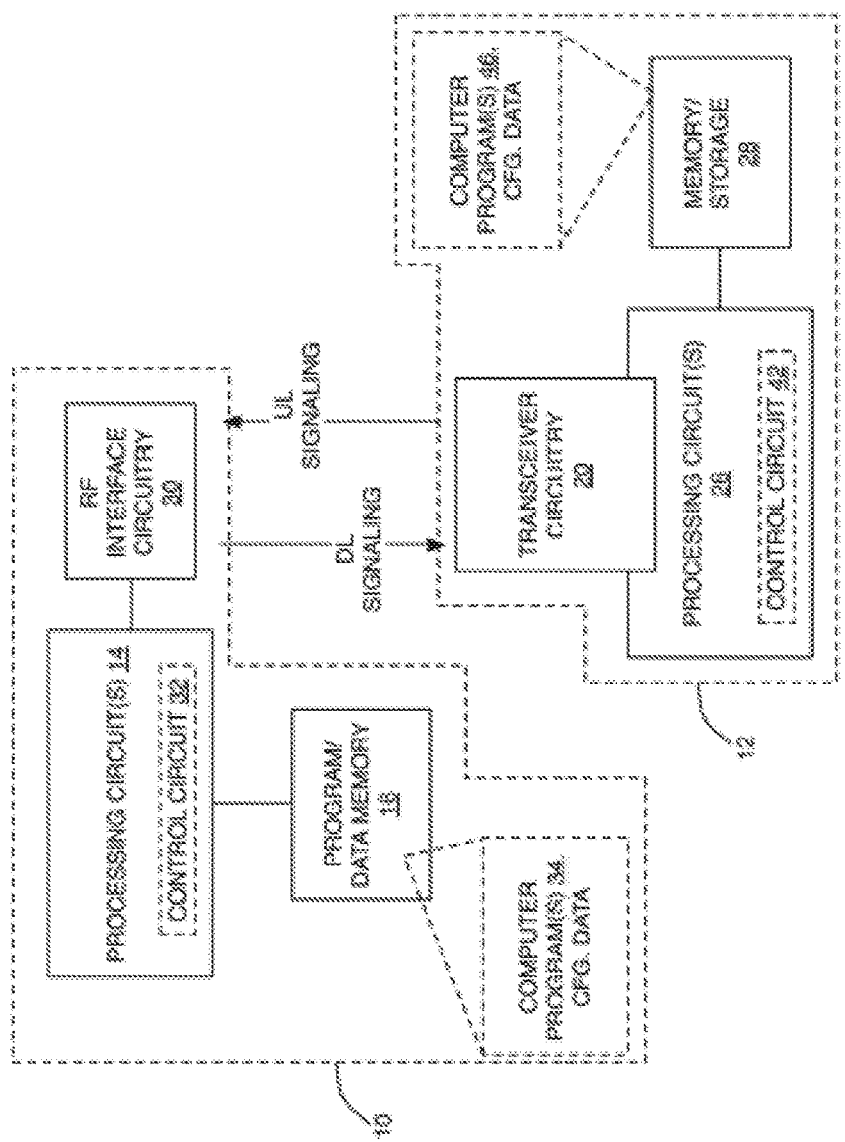
FIG. 2 is a block diagram of an examplary network node and a wireless device.

Those of ordinary skill in the art will appreciate that FIG. 2 illustrates functional and/or physical circuit arrangements and that the network node 10 and the wireless device 12 generally will include digital processing circuits and associated memory or other computer-readable medium for storing configuration data, operational or working data, and for storing computer program instructions. In at least some of the embodiments contemplated herein, the network-side and device-side functionality is realized at least in part through the programmatic configuration of digital processing circuitry, based on the execution by that circuitry of stored computer program instructions.

One sees from the example that the network node 10 includes a processing circuit 14 and associated memory/storage 16. The memory/storage 16 comprises, for example, one or more types of computer-readable medium, such as a mix of volatile, working memory and non-volatile configuration and program memory or storage. The network node 10 further comprises one or more communication interfaces 18.

The communication interface 18 depends on the nature of the network node 10. In a base station or other radio node example, the communication interface 18 includes a radio transceiver, e.g., pools of radio transmission, reception, and processing circuitry, for communicating with any number of wireless devices 12 in any one or more cells of a wireless communication network. In such example cases, the communication interface 18 includes one or more transmitters and receivers, e.g., cellular radio circuits, along with power control circuitry and associated signal-processing circuitry. Further, in the same scenario, the communication interface 18 may include inter-base-station interfaces and/or backhaul or other Core Network, CN, communication interfaces.

Regardless of its particular intended use, FIG. 1 illustrates the wireless device 12 as including a communication interface, e.g., a radiofrequency transceiver 20 that includes a receiver 22 and a transmitter 24. The illustrated wireless device 12 further includes one or more processing circuits 26, which include or are associated with one or more memory/storage devices or circuits 28. The memory/storage devices or circuits 28 include, for example, one or more types of computer-readable medium, such as a mix of volatile, working memory and non-volatile configuration and program memory or other storage The network in an example embodiment comprises a Long Term Evolution or LTE network, or a LTE-Advanced network, meaning that the network is configured to operate according to the applicable specifications promulgated by the Third Generation Partnership Project or 3GPP. The network may also be referred to as a communication system. In the LTE context, the base stations—referred to as eNBs or eNodeBs or network nodes 10—provide an air interface for wirelessly connecting the wireless devices 12 to the network, where the air interfaces use Orthogonal Frequency Division Multiple Access or OFDMA on the downlink and use Single Carrier-Frequency Division Multiple Access or SC-FDMA on the uplink. It will be appreciated that the wireless devices 12 are configured to operate with the air interface, spectrum, and protocols adopted by the network in the LTE case, and in other cases.

The network schedules at least some types of uplink data transmissions by the wireless devices 12. For example, in LTE, Physical Uplink Shared Channel, PUSCH, transmissions are scheduled by a base station 10, based on the base station sending uplink grants to respective ones of the wireless devices 12 being served by the base station. The base station uses associated reference signals transmitted from the wireless devices 12 to demodulate or otherwise process the scheduled uplink data transmissions.

The embodiments disclosed herein are directed to new uplink grant design for short TTIs in uplink, which enables flexible configuration of positions of reference signals and user data, with a low overhead in number of used bits.

An uplink grant is proposed with an index indicating both length of TTI, cyclic shift of reference signals, and position of reference signal in relation to user data symbols. This index includes different number of reference signal configurations of for different TTIs.

A potential advantage of the proposed solution is that the proposed solution has less control signaling overhead as compared to granting length of TTI, cyclic shift and position of reference signals and user data symbols separately.

Uplink Scheduling Grants:

The existing physical layer downlink control channels, Physical Downlink Control Channel (PDCCH) and enhanced PDCCH (ePDCCH), are used to carry Downlink Control Information (DCI) such as scheduling decisions and power control commands. Both PDCCH and ePDCCH are transmitted once per 1 ms SF. A short downlink control channel (sPUCCH) which can be transmitted more often than once each millisecond is considered for future releases.

There are currently a number of different Downlink Control Information (DCI) formats, see 3GPP TS 36.212, for uplink and downlink resource assignments. Uplink scheduling grants use either DCI format 0 or DCI format 4. The latter is added in Release 10 for supporting uplink spatial multiplexing.

In general, the DCI for an uplink scheduling grant contains;

Resource allocation information:
    Carrier indicator
    Resource allocation type
    Resource block allocation
RS and data related information:
    modulation and coding scheme (MCS)
    New data indicator
    Cyclic shift of the uplink demodulation reference signals (DMRS)
    Precoding information Transmit power control
Other information:
  SRS request
  CSI request
  UL index (for TDD)
  Padding
  CRC scrambled with RNTI of the terminal In Multi User MIMO (MU-MIMO), several devices share the same time and frequency resources. This requires several receiver antennas, a receiver which is capable of multi-user detection in the demodulation and a radio channel which is rich enough for separation of the device signals in the demodulation. Within this demodulation, the radio channel for each device must be estimated. In LTE release 8, the devices can be configured to use different time cyclic shifts of the reference signals within the same SC-FDMA symbol [See 3GPP TS 36.211 section 5.5.1 and 5.5.2.1.1]. This cyclic shift corresponds to a known cyclic time delay of the reference signal. If this cyclic time delay is larger than the delay spread of the radio channel, then the receiver can estimate the channels for different devices separately.

Several cyclic shifts of the reference signals are also used for Single User MIMO (SU-MIMO). Here the same device is transmitting several reference signals but from different antennas.

More reference signals can also be constructed by using Orthogonal Cover Codes (OCC) where one reference signal is defined as sending the same signal in both two slots of a sub-frame, and another reference signal is defined as sending the same reference signals but with alternating sign between the two slots [see 3GPP TS 36.211 section 5.5.2.1.1].

Dynamic Switching Between TTI Lengths

As mentioned, one way to reduce latency is to reduce the transmission time interval (TTI), and instead of assigning resources with time duration of 1 ms, there is then a need to assign resources with shorter duration such as a reducing the number of OFDM or SC-FDMA symbols. This implies a need for UE specific control signaling that enables indication of such short scheduling assignments.

Furthermore, there is also a need to be able to dynamically switch between TTI duration, for example between legacy 1 ms TTIs as well as shorter TTIs, in order to optimize the spectral efficiency (since shorter TTIs may incur higher overhead and/or worse demodulation performance).

Throughout the exemplary embodiments, the term short PDSCH (sPDSCH) and short PUSCH (sPUSCH) is used to denote the downlink and uplink physical shared channels with TTIs less than one sub-frame, respectively. Similarly, short PDCCH (sPDCCH) is used to denote downlink physical control channels with TTIs less than one sub-frame.

Reference Signal Placement:

A discussion about the position or placement of reference signals for PUSCH based on short TTIs is given in "R1-157149, Physical layer aspects of short TTI for uplink transmissions, Ericsson, RAN1 #83, November 2015".

An uplink shared channel PUSCH with shortened TTI should be based on one or a few data SC-FDMA symbols. These symbols for user data also require an additional symbol used for reference signal in the UL TTI. In principle, it is beneficial if the reference symbol can be sent early in the TTI allowing the eNB to start processing as soon as possible. However this may not always be practical.

In order to reduce RS overhead, there is a possibility to reduce the number of DMRS transmissions by sharing RS symbol between multiple UEs. The symbols used for user data will however not be shared. The eNB will be able to separate the different UEs by assigning the RS different cyclic shifts, similar to UL MU-MIMO. Further reduction of the DMRS overhead can be achieved for UEs scheduled in multiple shortened TTIs within a limited time window by not transmitting RS in every shortened TTI.

As an additional benefit the reference signal in a very short TTI (e.g. a 2-symbol TTI) can provide better channel estimation compared to the legacy 1 ms TTI, especially when the Doppler spread is high, implying that very short TTIs have the potential to support high mobility scenarios.

Figure 3:
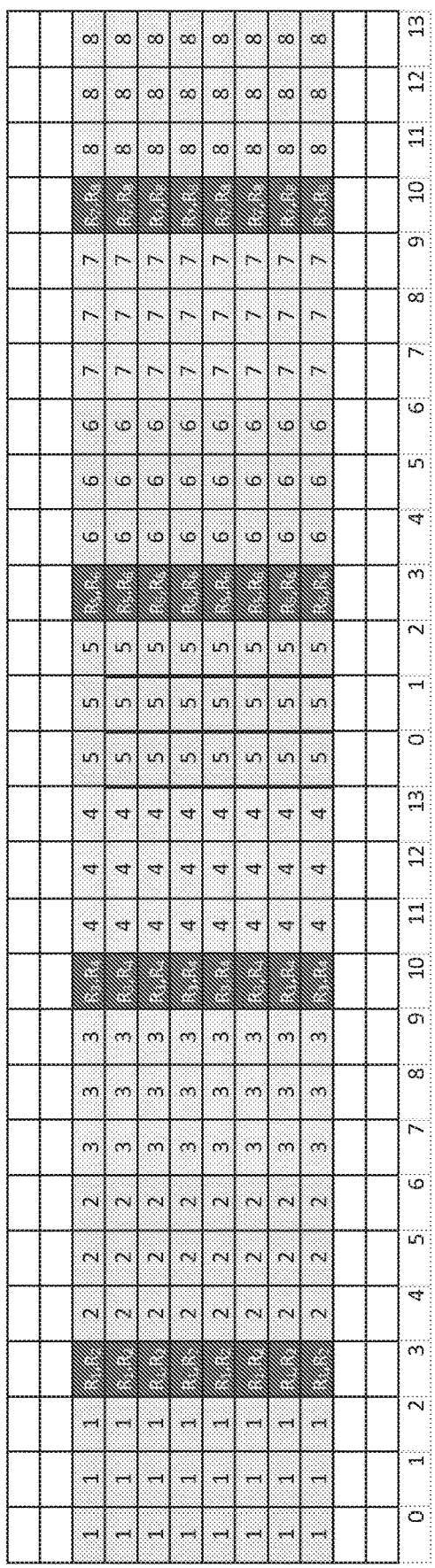
FIG. 3 illustratively shows PUSCH with a TTI of 3 user data SC-FDMA symbols and multiplexing of RS from 2 UEs in the same SC-FDMA symbol.

Considering the above aspects a few design options with different TTI lengths are highlighted. In FIG. 3 illustrates a TTI length of 4 (i.e. 3 symbols for data). Here two users share the same position for their UL DMRS. For multiplexing of more reference signals we expect the channel estimation to degrade due to interference between the different users.

Figure 4:
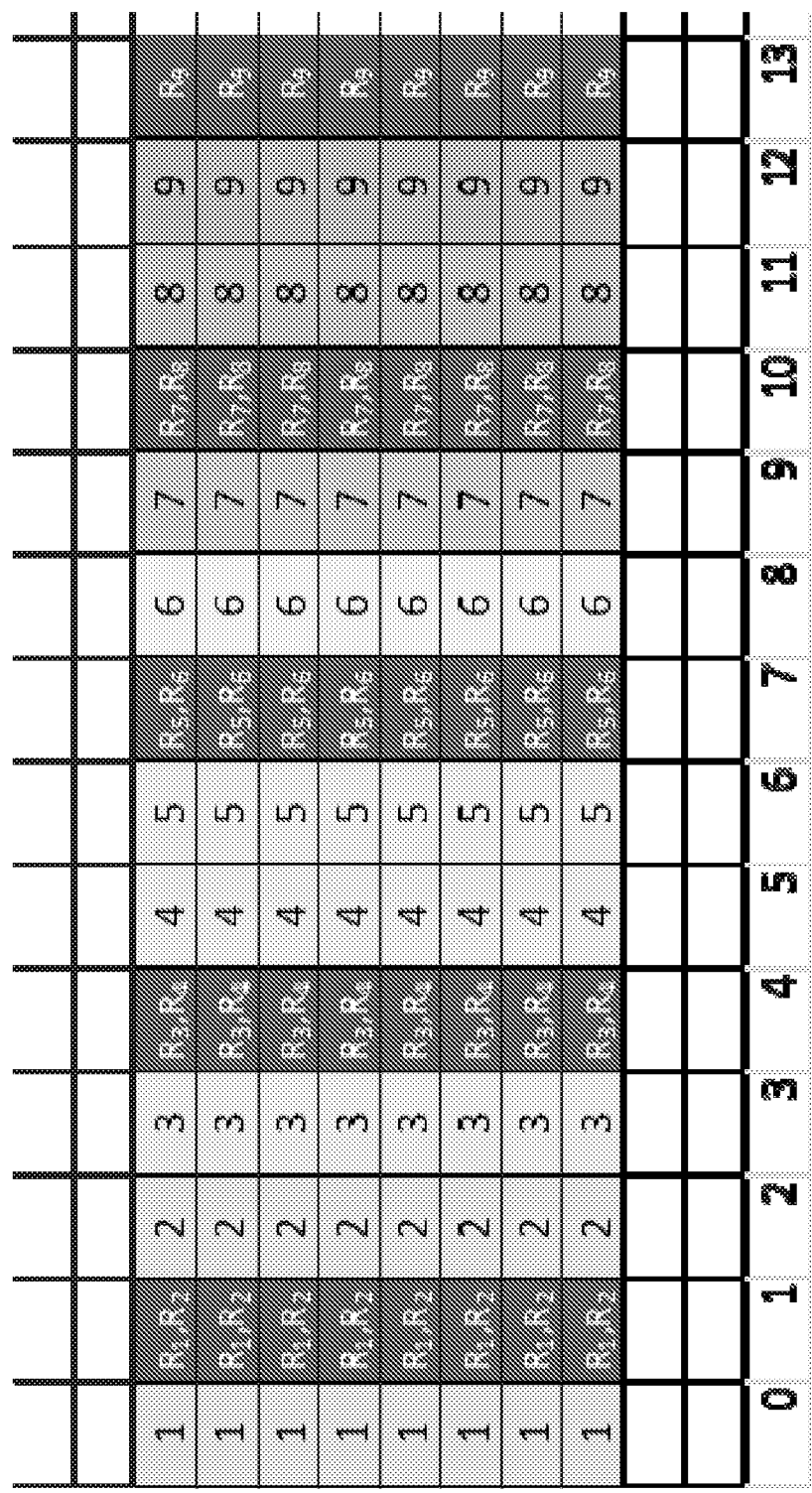
FIG. 4 illustratively shows PUSCH with a TTI of 1 SC-FDMA user data symbol and multiplexing of RS from 2 UEs in the same SC-FDMA symbol.

In the second example in FIG. 4 the UL DMRS positions have been moved, to allow for a sTTI of 2 symbols (i.e. 1 symbol data). Here the RS overhead is increased. Also in this example 2 UEs are sharing each UL DMRS.

Figure 5:
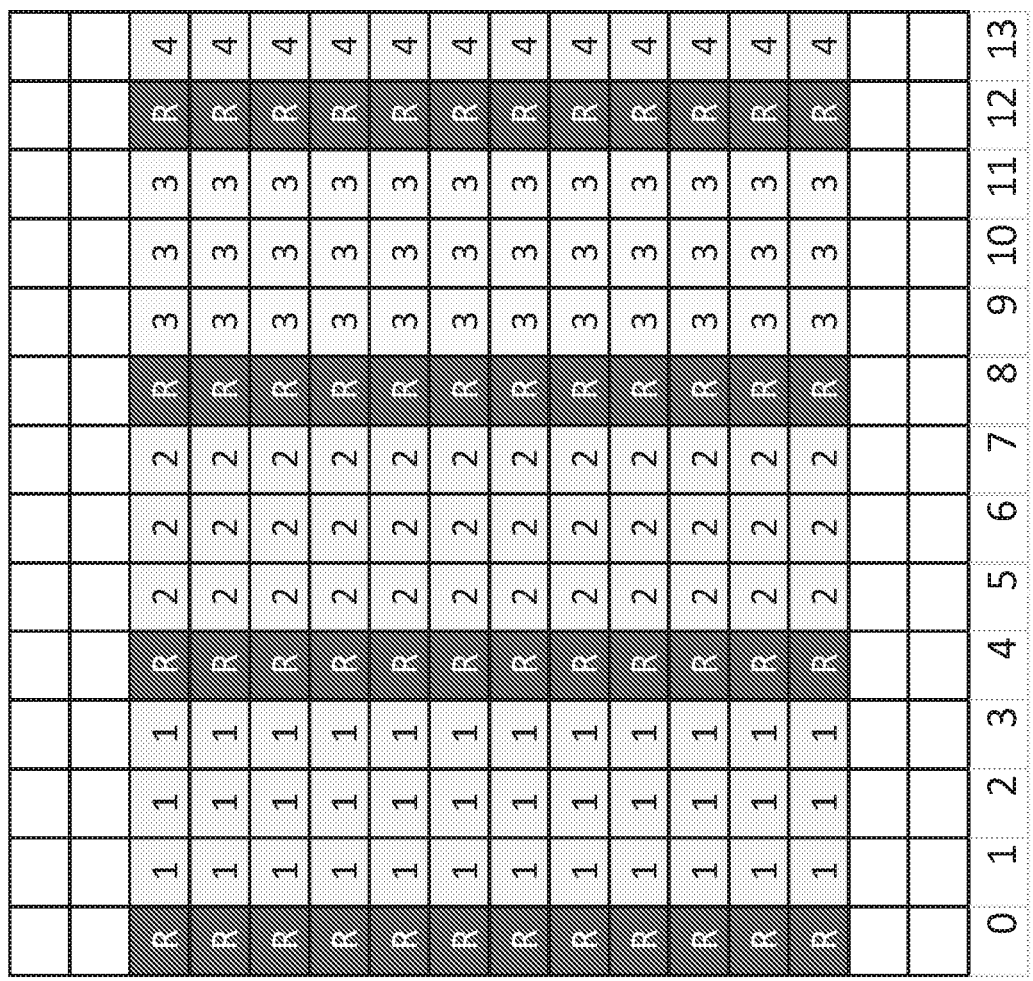
FIG. 5 illustratively shows PUSCH with a TTI of 4 or 2 SC-FDMA symbols with separate RS in each TTI.

In a third example, illustrated in FIG. 5, each TTI has one RS sent before the data symbols, where only the scheduled UE transmit.

The reference signal overhead is somewhat large for TTIs with 2 symbols, of which one is a reference symbol. This overhead can be decreased by increasing the number of multiplexed reference signals. See example in FIG. 6, where the reference signals associated with 6 different PUSCH transmissions are multiplexed. Here, the UE with index 1 is transmitting user data in symbol 0, UE 2 in symbol 1 etc. In symbol 3 the reference signals from UE 1 to UE 6 are multiplexed. In the same manner, the reference signals from UE 7 to 12 are multiplexed in symbol 10.

Figure 6:
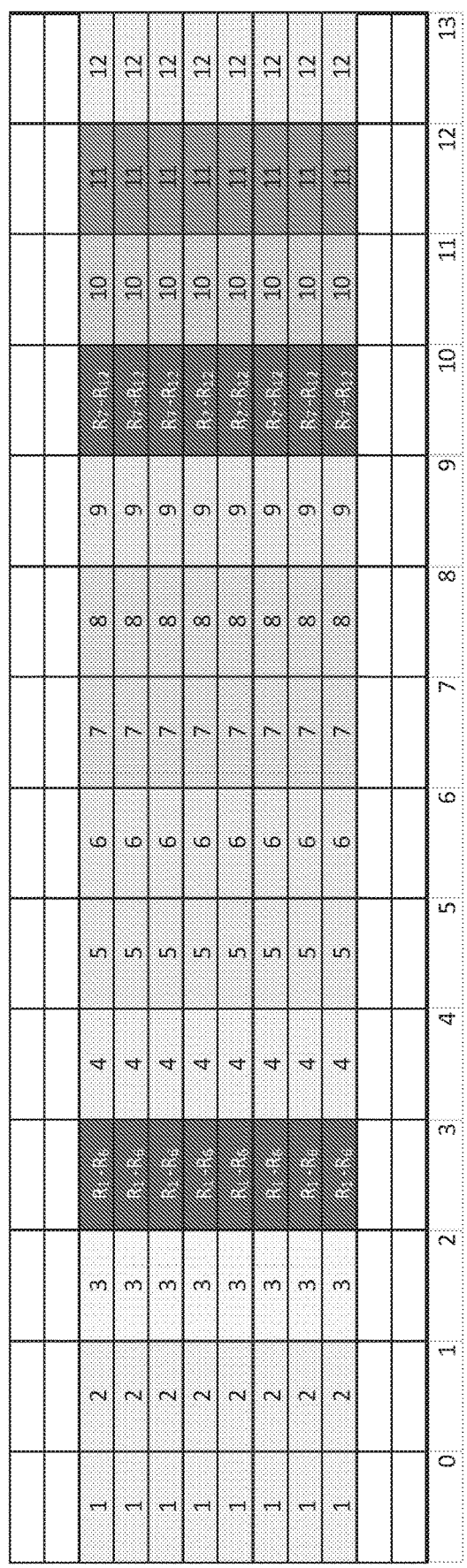
FIG. 6 illustratively shows PUSCH with a TTI of 1 SC-FDMA user data symbols with RS multiplexing between 6 PUSCH transmissions.
Figure 7:
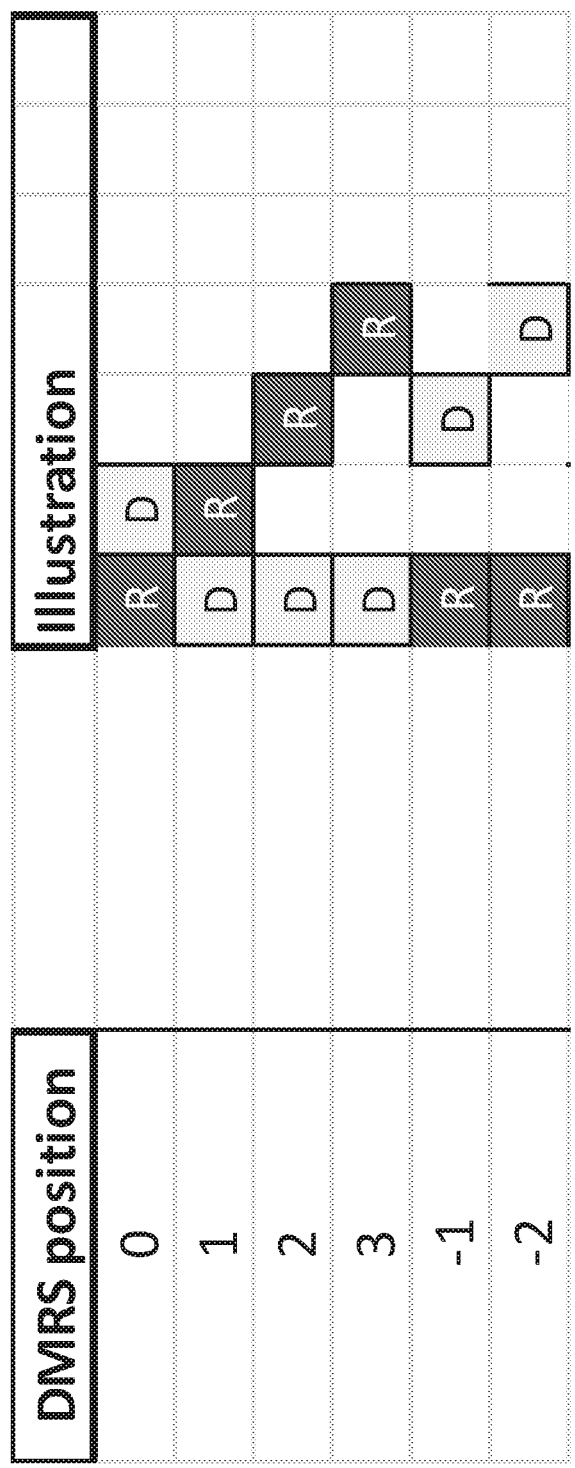
FIG. 7 illustratively shows reference signals positions relative to the data symbols.

The reference signals in FIG. 6 are thus shifted as compared to the user data symbols. A list of possible reference signals positions relative to the data symbols is given in FIG. 7. Here six different DMRS configurations are listed, which would need 3 bits in an uplink grant.

The existing way of operation, e.g. frame structure and control signaling, are designed for fixed length 1 ms data allocations, which may vary only in allocated bandwidth. Specifically, the current DCIs define resource allocations within the entire SF.

Exemplary Embodiments of Uplink Grant

The uplink grant is transmitted on symbol basis in downlink and it is user-specific. This grant contains information for both RS and data configuration for a short PUSCH. The uplink grant enables flexible configuration of a sPUSCH, by indicating the positions and lengths of both RS and data symbols, as well as the length of the sPUSCH.

An example of mapping between a "TTI index" to TTI length and position of reference signals is given in FIG. 8. Here, all the cases as illustrated in FIG. 2 to FIG. 6 are supported, with a few additional configurations such as TTI index 6 to 10 and 12 to 13.

In one embodiment, the cyclic shift of the reference signal is also given by the TTI index, see example in FIG. 8. Cyclic shifts between 0 and 11 are supported, as described in section 5.5.2.1.1 in [3GPP TS 36.211, V 12.6.0]. Here, the interference between reference signals is lower for large distances between indices as compared to smaller distances in index. This list of index is cyclic such that index 0 is close to index 11.

An alternative mapping is illustrated in FIG. 9, where support is included for configurations with one user data symbol only and with one reference signal only. A few configurations which were included in FIG. 8 have been removed in FIG. 9, to keep the TTI index to 4 bits.

A restricted set of configurations based on 3 bits is illustrated in FIG. 10. Here the configurations always results in reference signals in a symbol adjacent, or embedded between, user data symbols. With these configurations, the number of multiplexed reference signals into the same symbol is limited to a maximum of 2 reference signals.

A restricted set of configurations based on 2 bits is illustrated in FIG. 11. Here the configurations always results in reference signals in the first symbol of the TTI for TTI between 2 and 4 symbols, and in the middle symbol for TTIs of 7 symbols.

In FIG. 12, there is room for only one placement for each of the TTI lengths, which would imply that DMRS multiplexing is not possible. FIG. 13 shows an example where the position of the TTI determines the DMRS position within the TTI. Only a few starting positions are given, and the list can be extended to include all combinations of TTI lengths and starting position.

Figure 14:
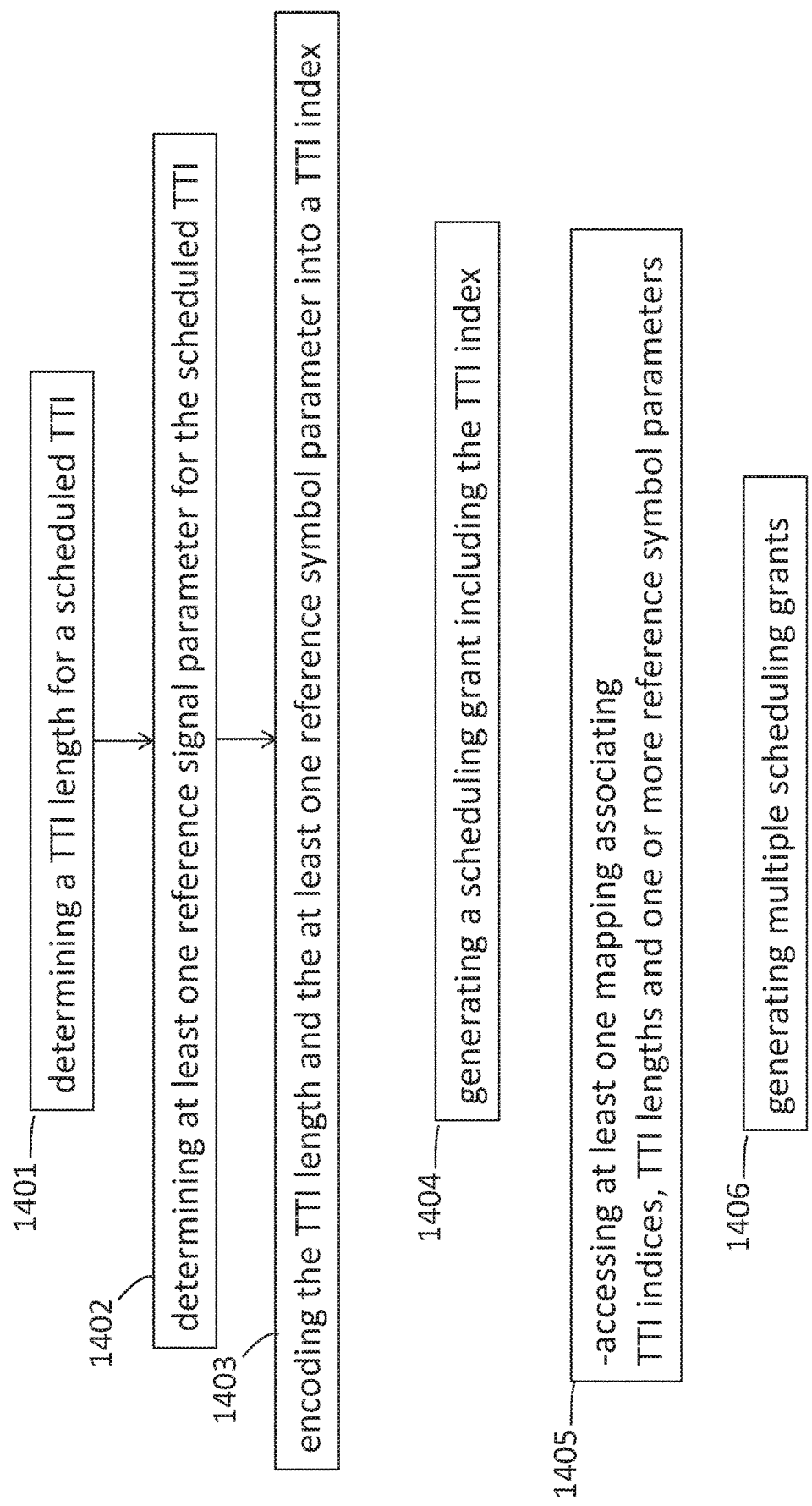

FIG. 14 shows block diagram of exemplary embodiments. The embodiments include a method for generating a scheduling grant for a wireless device of a communication system, where the communication system supports variable TTI lengths to be transmitted in one TTI. The method includes determining a TTI length for a scheduled TTI, where the TTI length is determined in number of symbols, step 1401. The method further includes determining at least one reference signal parameter for the scheduled TTI, where the at least one reference symbol parameter is selected from a reference symbol position and a reference symbol cyclic shift, step 1402. Finally, the method includes encoding the TTI length and the at least one reference symbol parameter into a TTI index, 1403.

Figure 15:
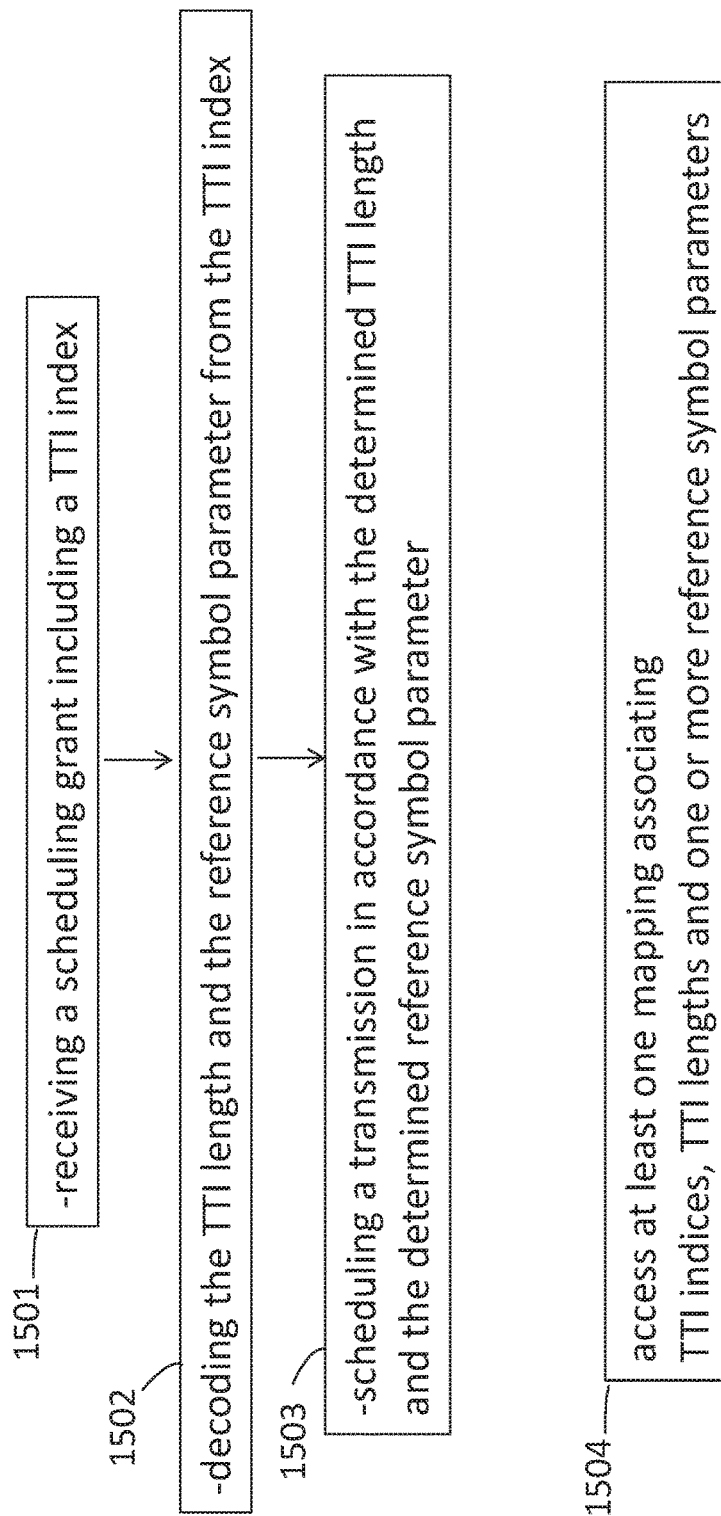
FIG. 15 illustratively shows a block diagram of example embodiments of a wireless device configured according to the teachings herein FIG. 16 illustratively shows a block diagram of example embodiments of a wireless device configured according to the teachings herein.

FIG. 15 shows block diagram of further exemplary embodiments. The embodiments include a method for a wireless device for a communication system supporting variable TTI lengths regarding a number of symbols to be transmitted in one TTI. The method includes receiving a scheduling grant including a TTI index, where the TTI index encodes a TTI length and at least one reference symbol parameter for a scheduled TTI, where the at least one reference symbol parameter is selected from a reference symbol position and a reference symbol cyclic shift, step 1501. The method further includes decoding the TTI length and the reference symbol parameter from the TTI index, step 1502, and scheduling a transmission in accordance with the determined TTI length and the determined reference symbol parameter, step 1503.

Figure 16:
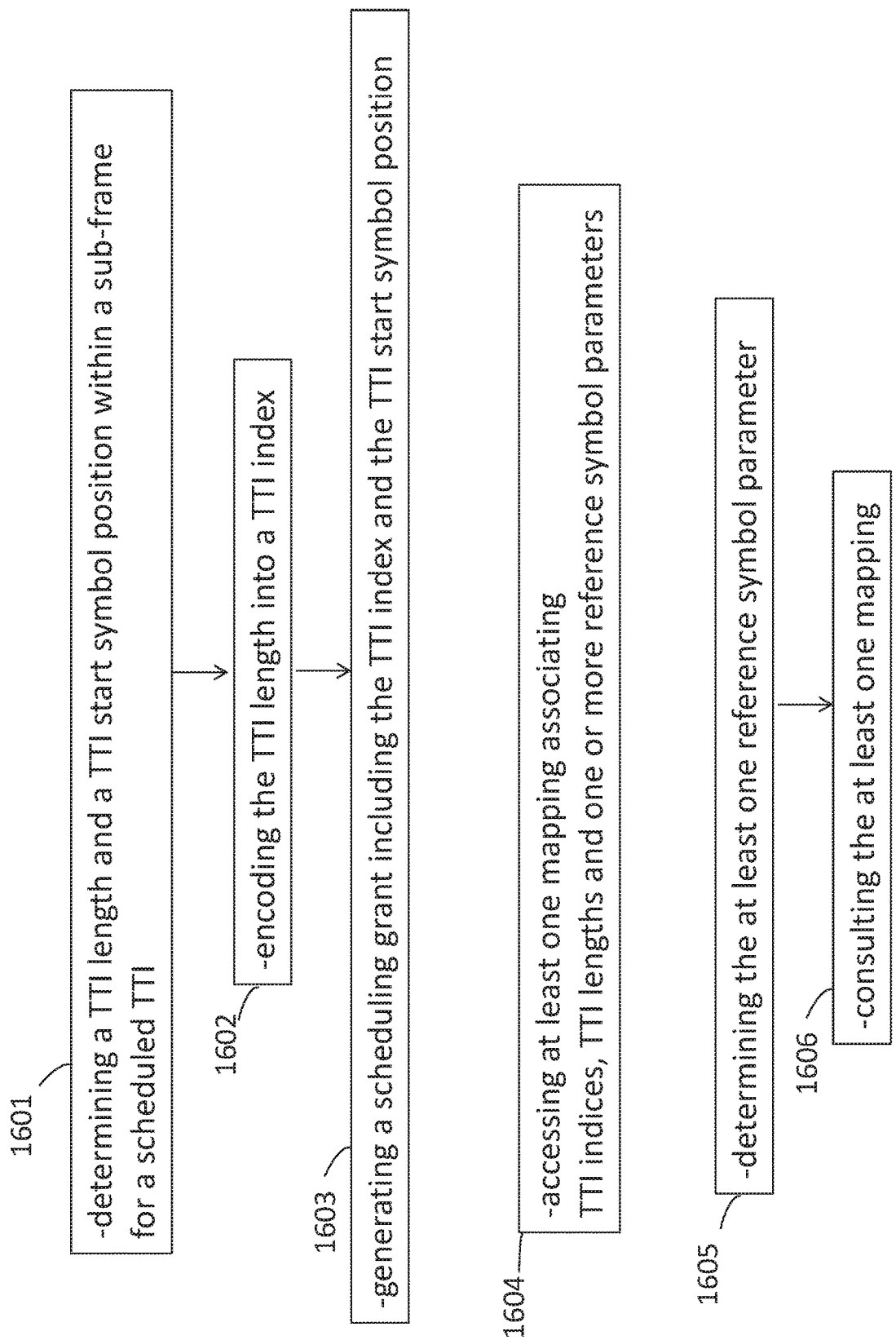

FIG. 16 shows a block diagram of further exemplary embodiments. The embodiments include a method for generating a scheduling grant for a wireless device of a communication system, where the communication system supports variable Transmission Time Interval, TTI, lengths regarding a number of symbols to be transmitted in one TTI-generate a scheduling grant including the TTI index and the TTI start symbol position. The method includes determining a TTI length and a TTI start symbol position within a sub-frame for a scheduled TTI, where the determined TTI length and TTI start symbol position are uniquely associated with at least one reference symbol parameter and where the at least one reference symbol parameter is selected from a reference symbol position and a reference symbol cyclic shift, step 1601. The method further includes encoding the TTI length into a TTI index, step 1602. Furthermore, the method includes generating a scheduling grant including the TTI index and the TTI start symbol position, step 1603.

Figure 17:
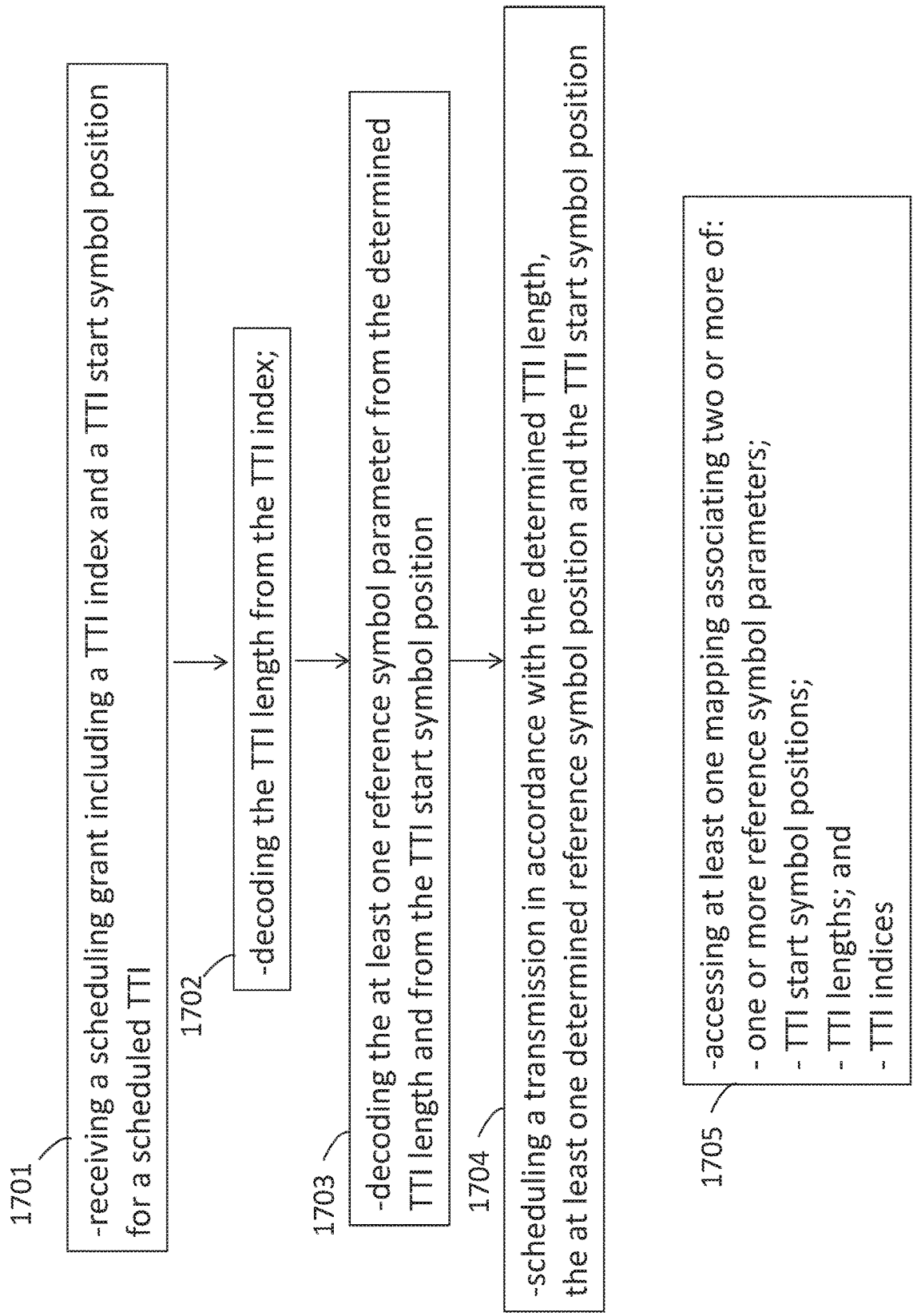
FIG. 17 illustratively shows a block diagram of example embodiments of a wireless device configured according to the teachings herein.

FIG. 17 shows a block diagram of further exemplary embodiments. The embodiments include a method for a wireless device for a communication system supporting variable Transmission Time Interval, TTI, lengths regarding a number of symbols to be transmitted in one TTI. The method includes receiving a scheduling grant including a TTI index and a TTI start symbol position for a scheduled TTI, where the TTI index encodes a TTI length for the scheduled TTI and where the TTI length and the TTI start symbol position are uniquely associated with at least one reference symbol parameter, where the at least one reference symbol parameter is selected from a reference symbol position and a reference symbol cyclic shift, step 1701. The method further includes decoding the TTI length from the TTI index, step 1702. Furthermore, the method includes decoding the at least one reference symbol parameter from the determined TTI length and from the TTI start symbol position, step 1703. Finally, the method includes scheduling a transmission in accordance with the determined TTI length, the at least one determined reference symbol position and the TTI start symbol position, step 1704.

Abbreviations

MCS Modulation and Coding Scheme
OFDM Orthogonal Frequency Division Multiple Access
PDCCH Physical Downlink Control Channel
PDSCH Physical Downlink Shared Channel
PRB Physical Resource Block
PUSCH Physical Uplink Shared Channel
RAT Radio Access Technology
RB Resource Block
RE Resource Element
RRC Radio Resource Control
SC-FDMA Single Carrier-Frequency Division Multiple Access
sPDCCH short Physical Downlink Control Channel
sPDSCH short Physical Downlink Shared Channel
sPUSCH short Physical Uplink Shared Channel
SF SubFrame
TTI Transmission Time Interval

FURTHER DEFINITIONS AND EMBODIMENTS

Selected examples of a method and apparatus associated to embodiments herein may relate to the following:

Embodiment 1

A method for generating a scheduling grant for a wireless device of a communication system, wherein the communication system supports variable Transmission Time Interval, TTI, lengths to be transmitted in one TTI, the method comprising:
  determining a TTI length for a scheduled TTI, wherein the TTI length is determined in number of symbols;
  determining at least one reference signal parameter for the scheduled TTI, wherein the at least one reference symbol parameter is selected from a reference symbol position and a reference symbol cyclic shift; and
  encoding the TTI length and the at least one reference symbol parameter into a TTI index.

Embodiment 2

The method of embodiment 1, further comprising:
generating a scheduling grant including the TTI index.

Embodiment 3

The method of embodiments 1-2, wherein the reference symbol position is position relative to a user data symbol.

Embodiment 4

The method of embodiments 1-3, further comprising:
accessing at least one mapping associating TTI indices, TTI lengths and one or more reference symbol parameters, wherein the TTI length and the one or more reference symbol parameters are encoded into the TTI index using the at least one mapping.

Embodiment 5

The method of embodiments 1-4, wherein the scheduling grant further includes a TTI start symbol position within a sub-frame.

Embodiment 6

The method of embodiments 1-5, further comprising:
generating multiple scheduling grants indicative of different TTI start symbol positions within the sub-frame.

Embodiment 7

A method for generating a scheduling grant for a wireless device of a communication system, wherein the communication system supports variable Transmission Time Interval, TTI, lengths regarding a number of symbols to be transmitted in one TTI, the method comprising:
determine a TTI length and a TTI start symbol position within a sub-frame for a scheduled TTI, wherein the determined TTI length and TTI start symbol position are uniquely associated with at least one reference symbol parameter and wherein the at least one reference symbol parameter is selected from a reference symbol position and a reference symbol cyclic shift;
encode the TTI length into a TTI index; and
generate a scheduling grant including the TTI index and the TTI start symbol position.

Embodiment 8

The method of embodiment 7 further comprising:
accessing at least one mapping associating two or more of:
one or more reference symbol parameters, TTI start symbol positions, TTI lengths, and TTI indices.

Embodiment 9

The method of embodiment 8, wherein the TTI length is encoded into the TTI index using the mapping.

Embodiment 10

The method of embodiment 9 further comprising:
determining the at least one reference symbol parameter; and
consulting the at least one mapping to determine the TTI start symbol position that is mapped on a combination of the determined at least one reference symbol parameter and one of the determined TTI length and the associated TTI index.

Embodiment 11

The method of any of the preceding embodiments, wherein the reference symbol position is defined relative to one or more data symbols to be transmitted by the wireless device responsive to the scheduling grant.

Embodiment 12

The method of any of the preceding embodiments, wherein the TTI index has a length between two and six bits.

Embodiment 13

The method of any of the preceding embodiments, wherein at least one of the variable TTI lengths is between two and seven symbols.

Embodiment 14

The method of any of the preceding embodiments, wherein the scheduling grant is an uplink scheduling grant.

Embodiment 15

An apparatus configured to perform to the steps of any of the preceding method embodiments.

Embodiment 16

A base station or base station system comprising the apparatus of embodiment 15.

Embodiment 17

Method for a wireless device for a communication system supporting variable Transmission Time Interval, TTI, lengths regarding a number of symbols to be transmitted in one TTI, the method comprising:
receiving a scheduling grant including a TTI index, wherein the TTI index encodes a TTI length and at least one reference symbol parameter for a scheduled TTI, wherein the at least one reference symbol parameter is selected from a reference symbol position and a reference symbol cyclic shift;
decoding the TTI length and the reference symbol parameter from the TTI index; and
scheduling a transmission in accordance with the determined TTI length and the determined reference symbol parameter.

Embodiment 18

The method of embodiment 17, wherein the method further comprises:
access at least one mapping associating TTI indices, TTI lengths and one or more reference symbol parameters, wherein the TTI length and the one or more reference symbol parameters are decoded from the TTI index using the at least one mapping.

Embodiment 19

A method for a wireless device for a communication system supporting variable Transmission Time Interval, TTI, lengths regarding a number of symbols to be transmitted in one TTI, the wireless device being configured to:

receive a scheduling grant including a TTI index and a TTI start symbol position for a scheduled TTI, wherein the TTI index encodes a TTI length for the scheduled TTI and wherein the TTI length and the TTI start symbol position are uniquely associated with at least one reference symbol parameter, wherein the at least one reference symbol parameter is selected from a reference symbol position and a reference symbol cyclic shift;

decode the TTI length from the TTI index;

decode the at least one reference symbol parameter from the determined TTI length and from the TTI start symbol position; and schedule a transmission in accordance with the determined TTI length, the at least one determined reference symbol position and the TTI start symbol position.

Embodiment 20

The method of embodiment 19, wherein the method is further comprising:

accessing at least one mapping associating two or more of:

one or more reference symbol parameters;

TTI start symbol positions;

TTI lengths; and

TTI indices.

Embodiment 21

A wireless device configured to perform to the steps of any of the preceding method embodiments.

Embodiment 22

A user equipment comprising the wireless device of any of the preceding embodiments.

Embodiment 23

A computer program product comprising program code portions to perform the steps of any of the preceding method embodiments when the computer program product is executed on one or more processing devices.

Embodiment 24

The computer program product of embodiment 23, stored on one or more computer-readable recording media.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method for a network node for generating a scheduling grant for a wireless device of a communication system, wherein the communication system supports variable Transmission Time Interval (TTI) lengths to be transmitted in one TTI, the method comprising:
   determining a TTI length for a scheduled TTI, wherein the TTI length is determined in number of symbols;
   determining at least one reference signal parameter for the scheduled TTI, wherein the at least one reference symbol parameter is selected from a reference symbol position and a reference symbol cyclic shift;
   accessing at least one mapping associating TTI indices, TTI lengths and one or more reference symbol parameters; and
   encoding the TTI length and the at least one reference symbol parameter into a TTI index,
   wherein the TTI length and the one or more reference symbol parameters are encoded into the TTI index using the at least one mapping.

2. The method of claim 1, further comprising generating a scheduling grant including the TTI index.

3. The method of claim 1, wherein the reference symbol position is position relative to a user data symbol.

4. The method of claim 1, wherein the scheduling grant further includes a TTI start symbol position within a sub-frame.

5. The method of claim 1, further comprising generating multiple scheduling grants indicative of different TTI start symbol positions within the sub-frame.

6. The method of claim 2, further comprising-determining a TTI start symbol position within a sub-frame for the scheduled TTI, wherein the determined TTI length and TTI start symbol position are uniquely associated with the at least one reference signal parameter, wherein generating a scheduling grant is performed by generating a scheduling grant that further includes the TTI start symbol position.

7. The method of claim 6, wherein determining a TTI start symbol position is performed by consulting the at least one mapping to determine the TTI start symbol position that is mapped on a combination of the determined at least one reference signal parameter and one of the determined TTI length and the associated TTI index.

8. The method of claim 1, wherein the reference symbol position is defined relative to one or more data symbols to be transmitted by the wireless device responsive to the scheduling grant.

9. The method of claim 1, wherein the TTI index has a length between two and six bits.

10. The method of claim 1, wherein at least one of the variable TTI lengths is between two and seven symbols.

11. The method of claim 1, wherein the scheduling grant is an uplink scheduling grant.

12. A network node for use in a communication system that supports variable Transmission Time Interval (TTI) lengths to be transmitted in one TTI, the network node comprising a communication interface circuit and a processing circuit operatively coupled to the communication circuit and configured to:
   determine a TTI length for a scheduled TTI, wherein the TTI length is determined in number of symbols;
   determine at least one reference signal parameter for the scheduled TTI, wherein the at least one reference symbol parameter is selected from a reference symbol position and a reference symbol cyclic shift;
   access at least one mapping associating TTI indices, TTI lengths and one or more reference symbol parameters; and
   encode the TTI length and the at least one reference symbol parameter into a TTI index,
   wherein the TTI length and the one or more reference symbol parameters are encoded into the TTI index using the at least one mapping.

13. The apparatus of claim 12, wherein the processing circuit is further configured to generate a scheduling grant including the TTI index.

14. The apparatus of claim 12, wherein the processing circuit is further configured to generate multiple scheduling grants indicative of different TTI start symbol positions within the sub-frame.

15. A base station or base station system comprising the apparatus of claim 12.

16. A method for a wireless device for a communication system supporting variable Transmission Time Interval (TTI) lengths regarding a number of symbols to be transmitted in one TTI, the method comprising:
   receiving a scheduling grant including a TTI index, wherein the TTI index encodes a TTI length and at least one reference symbol parameter for a scheduled TTI, wherein the at least one reference symbol parameter is selected from a reference symbol position and a reference symbol cyclic shift;

accessing at least one mapping associating TTI indices, TTI lengths and one or more reference symbol parameters;

decoding the TTI length and the reference symbol parameter from the TTI index; and scheduling a transmission in accordance with the determined TTI length and the determined reference symbol parameter, wherein the TTI length and the one or more reference symbol parameters are decoded from the TTI index using the at least one mapping.

17. The method according to claim 16, wherein the scheduling grant further includes a TTI start symbol position for a scheduled TTI, wherein the TTI length and the TTI start symbol position are uniquely associated with the at least one reference symbol parameter, the method further comprising:

decoding the at least one reference symbol parameter further from the TTI start symbol position; and scheduling a transmission further in accordance with the TTI start symbol position.

18. A wireless device for use in a communication system that supports variable Transmission Time Interval (TTI) lengths to be transmitted in one TTI, the wireless device comprising a transceiver and a processing circuit operatively coupled to the transceiver and configured to:

receive a scheduling grant including a TTI index, wherein the TTI index encodes a TTI length and at least one reference symbol parameter for a scheduled TTI, wherein the at least one reference symbol parameter is selected from a reference symbol position and a reference symbol cyclic shift;

access at least one mapping associating TTI indices, TTI lengths and one or more reference symbol parameters;

decode the TTI length and the reference symbol parameter from the TTI index; and schedule a transmission in accordance with the determined TTI length and the determined reference symbol parameter; and, wherein the TTI length and the one or more reference symbol parameters are decoded from the TTI index using the at least one mapping.

19. The wireless device of claim 18, wherein the scheduling grant further includes a TTI start symbol position for a scheduled TTI, wherein the TTI length and the TTI start symbol position are uniquely associated with the at least one reference symbol parameter, and wherein the processing circuit is further configured to:

decode the at least one reference symbol parameter further from the TTI start symbol position; and schedule a transmission further in accordance with the TTI start symbol position.

20. A user equipment comprising the wireless device of claim 19.

* * * * *